(12) United States Patent
Marutani

(10) Patent No.: US 7,072,364 B2
(45) Date of Patent: *Jul. 4, 2006

(54) SYNCHRONIZATION AND SETTING SYSTEM FOR SIGNALS RECEIVED IN RADIO BASE STATION

(75) Inventor: Kenichi Marutani, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 233 days.

(21) Appl. No.: 09/398,106

(22) Filed: Sep. 16, 1999

(65) Prior Publication Data

US 2003/0161349 A1 Aug. 28, 2003

(30) Foreign Application Priority Data

Oct. 20, 1998 (JP) .......................................... 10-297479

(51) Int. Cl.
*H04J 3/06* (2006.01)

(52) U.S. Cl. ...................... 370/510; 370/513; 370/350; 370/465

(58) Field of Classification Search ......... 370/503–516, 370/324, 350, 328–331, 431, 436–437, 465
See application file for complete search history.

(56) References Cited

U.S. PATENT DOCUMENTS

| | | | | | |
|---|---|---|---|---|---|
| 5,471,655 | A | * | 11/1995 | Kivari ..................... | 455/127.5 |
| 5,883,929 | A | * | 3/1999 | Wang et al. ................. | 370/509 |
| 5,943,328 | A | * | 8/1999 | Hosford ...................... | 370/354 |
| 6,014,570 | A | * | 1/2000 | Wong et al. ................. | 455/500 |
| 6,119,263 | A | * | 9/2000 | Mowbray et al. ........... | 714/781 |
| 6,154,506 | A | * | 11/2000 | Ishikawa et al. ............ | 375/326 |
| 6,205,193 | B1 | * | 3/2001 | Solve et al. ................. | 375/354 |
| 6,243,372 | B1 | * | 6/2001 | Petch et al. ................. | 370/350 |
| 6,263,443 | B1 | * | 7/2001 | Anderson et al. ........... | 713/201 |
| 6,353,645 | B1 | * | 3/2002 | Solve et al. ................. | 375/354 |
| 6,366,574 | B1 | * | 4/2002 | Baissus et al. .............. | 370/350 |

FOREIGN PATENT DOCUMENTS

| | | |
|---|---|---|
| JP | 57-60515 | 4/1982 |
| JP | 60-251734 | 12/1985 |
| JP | 05-048513 | 2/1993 |
| JP | 07-095252 | 4/1995 |
| JP | 08-237192 | 9/1996 |
| JP | 11-055208 | 2/1999 |

* cited by examiner

*Primary Examiner*—Chi Pham
*Assistant Examiner*—Ronald Abelson
(74) *Attorney, Agent, or Firm*—Katten Muchin Rosenman LLP (57) ABSTRACT

A synchronization protecting and setting system for signals received in a radio base station whereby a protection of synchronized word SW detected in a first synchronized word detecting window AP1 can be maintained in a second synchronized word detecting window AP2 is provided. The synchronization protecting and setting method for signals received in a radio base station comprises a first unit generating a first synchronized word detecting window, which covers a position of synchronized word in a reception signal for a reference timing for transmission in the radio base station; a second unit generating a second synchronized word detecting window, which covers the position of the synchronized word in the first synchronized word detecting window; a synchronized word detecting unit detecting the synchronized word in the first or second synchronized word detecting window; and a controller resetting a position of the second synchronized word detecting window in the first synchronized word detecting window, in a predetermined condition.

10 Claims, 4 Drawing Sheets

SYNCHRONIZATION AND SETTING SYSTEM FOR SIGNALS RECEIVED IN RADIO BASE STATION

BACKGROUND OF THE INVENTION

1. Field of the Invention

The present invention relates to a synchronization protecting system for signals received in a radio base station.

2. Description of the Related Art

With the spread of recent movable or cellar communication systems, there is a demand for more reliability on a radio channel quality. To meet the demand, it is required to protect a radio channel quality by a synchronization protecting method having high ability.

In a prior method for protecting synchronization of signals received in a radio base station, which has been developed by the present applicant, a first synchronized word detecting window AP1 for the use to establish an initial synchronization is provided to cover a position of a synchronized word SW of a signal received from a cellar station, which is prescribed for a reference timing for transmission in the radio base station.

The synchronized word SW is detected in the first synchronized word detection window AP1. On the other hand, the position of synchronized word SW of the reception signal transmitted from the cellar station differs in every time a signal is received, according to a distance between the radio base station and the cellar station or a state of propagating radio waves. Accordingly, a width of the first synchronized word detecting window AP1 for use to establish an initial synchronization requires a width enough to cover the difference of the positions of the synchronized words SW of reception signals to certain extent.

However, once the synchronization is established, it can be predicted that the position of detecting the synchronized word SW is not widely changed at the time when the synchronized word SW is detected, namely, when the synchronization establishment is maintained after that.

Alternatively, to prevent from detecting the synchronized word by mistake in the first synchronized word detecting window AP1 having a wider width, a second synchronized word detecting window AP2, of which width is narrower than that of the first synchronized word detecting window AP1 is provided, based on a position of detecting an initial synchronized word detected in the first synchronized word detecting window AP1.

In other words, the second synchronized word detecting window AP2 protects the synchronized word SW detection, which is detected in the first synchronized word detecting window AP1. Once the second synchronized word detecting window AP2 becomes effective at the time of establishing an initial synchronization, a relationship of position with the first synchronized word detecting window AP1 is not changed, until there is no need to maintain the synchronization by finishing the communication with the cellar station.

In the method developed by the present applicant before, there is no means to change the position of setting the second synchronized word detecting window AP2 at the time when the position of detecting the synchronized word is larger than the width of the second synchronized word detecting window AP2, because the timing of receiving the signal from the cellar station is widely changed in the state the synchronization is once established.

Although the first synchronized word-detecting window AP1 can detect the synchronized word SW, the position of detecting the synchronized word is not within the second synchronized word-detecting window AP2. Therefore, that brings a problem such that the result of detecting in the second synchronized word-detecting window AP2 becomes inactive state.

SUMMARY OF THE INVENTION

Accordingly, it is an object of the present invention to provide a synchronization protecting and setting system for signals received in a radio base station, whereby a protection of the synchronized word SW detected by a first synchronized word detecting window AP1 can be maintained in a second synchronized word detecting window AP2, by improving the previously produced system.

The above-described objects can be achieved by a synchronization protecting and setting system for signals received in a radio base station including a first means generating a first synchronized word detecting window, which covers a position of a synchronized word in a reception signal for a reference timing of transmission in the radio base station; a second means generating a second synchronized word detecting window, which covers the position of the synchronized word in the first synchronized word detecting window; a means for detecting a synchronized word in the first or second synchronized word detecting window; and a control means for resetting the position of the second synchronized word detecting window under a predetermined condition.

In one detailed mode, the second synchronized word-detecting window is controlled so that when the synchronized word detecting means detects the synchronized word in the first synchronized word detecting window, the synchronized word is detected within the second synchronized word detecting window in a next frame.

In second detailed mode, the synchronized word is formed of plural bits, and the control means resets the position of the second synchronized word detecting window, when a bit error rate of the synchronized word is more than a predetermined value.

Further, in a third detailed mode, the reception signal includes a color code formed of plural bits, and the control means resets the position of the second synchronized word detecting window, when a bit error rate of the color code is more than a predetermined value.

Furthermore, in a fourth detailed mode, the control means resets the second synchronized word detecting window, when a difference of phases in the number of frames of the signals received in the radio base station is more than a predetermined value.

Additionally, in a fifth detailed mode, when the result of BCH decoding for signals received in the radio base station is mistaken, the control means resets the second synchronized word detecting window.

Alternatively, in a sixth detailed mode, when the result of CRC arithmetic for the signals received in the radio base station is mistaken, the control means resets the second synchronized word detecting window.

Furthermore, in a seventh detailed mode, the control means resets the second synchronized word detecting window, when the signal received in the radio base station is less than a predetermined value.

Further, other objects of the present invention become clear by the description for explaining embodiments according to the attached drawings.

BRIEF DESCRIPTION OF THE PRESENT INVENTION

DESCRIPTION OF THE PREFERRED EMBODIMENTS

Hereinafter, preferred embodiments of the present invention will be now described in reference to the drawings. Throughout the attached drawings, the same reference numerals and symbols are used to denote and identify corresponding or identical components.

Figure 1:
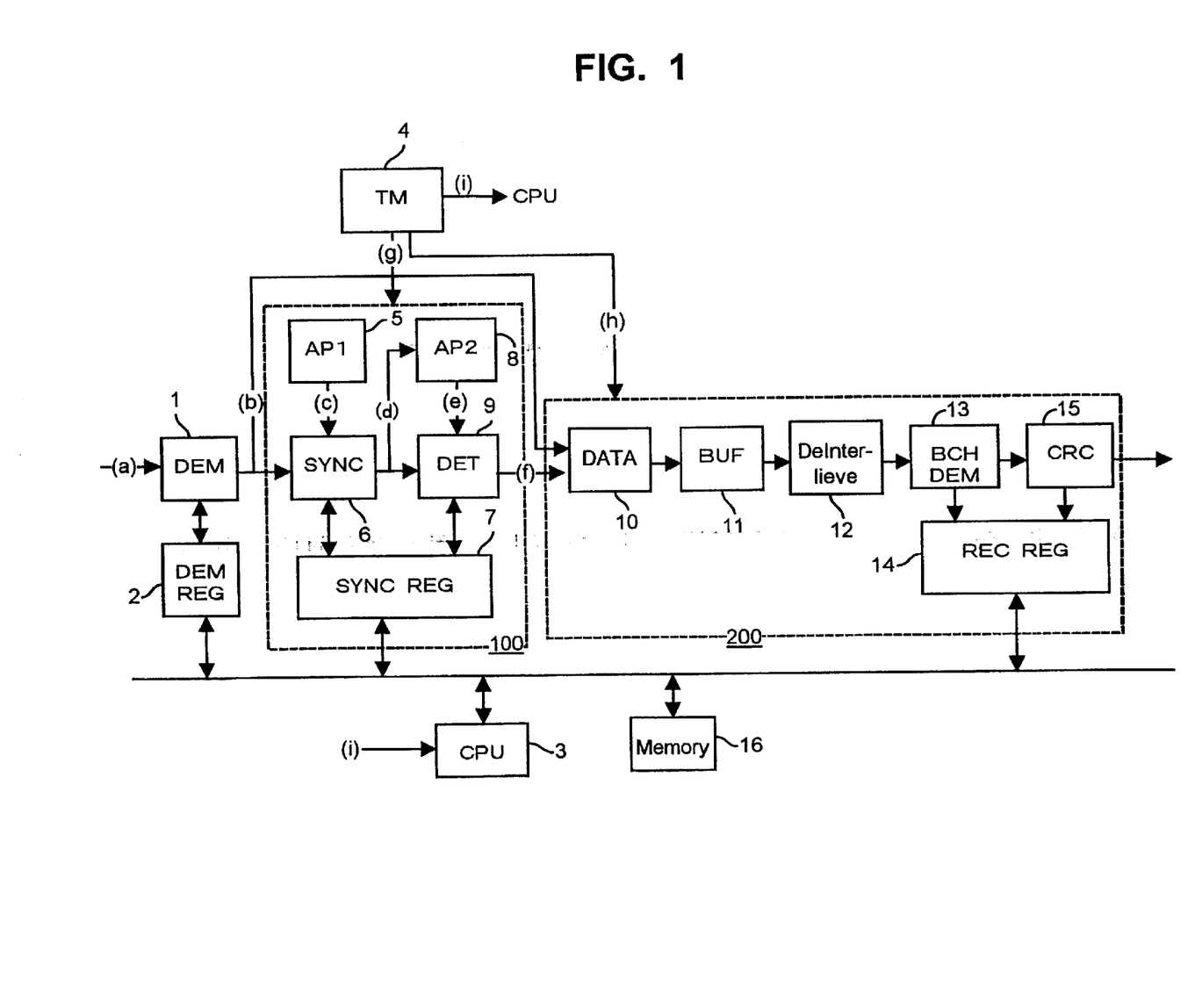
FIG. 1 is a structural block diagram of a radio base station according to the present invention.

FIG. 1 is a block diagram of a structural example of a radio base station according to the present invention. The radio base station receives a radio signal (a) transmitted from a cellar station, not shown in the diagram. A demodulator 1 in the radio base station converts the received radio signal (a) into a digital reception signal (b). The demodulator 1 detects a level of the received radio signal and stores the level in a register 2 of the demodulator 1. A CPU 3 can read out the level stored in the register 2 later.

The radio base station further includes a synchronizing section 100 having an AP1 generator 5, which generates a first synchronized word detecting window AP1 (c), according to reference timing and CLK (g) transmitted from a timing generator 4.

The synchronizing section 100 further has a synchronized word detecting section 6, which detects a synchronized word and color code of the digital reception signal (b) in the first synchronized word detecting window AP1 (c) transmitted from the AP1 generator 5.

Figures 2A, 2B:
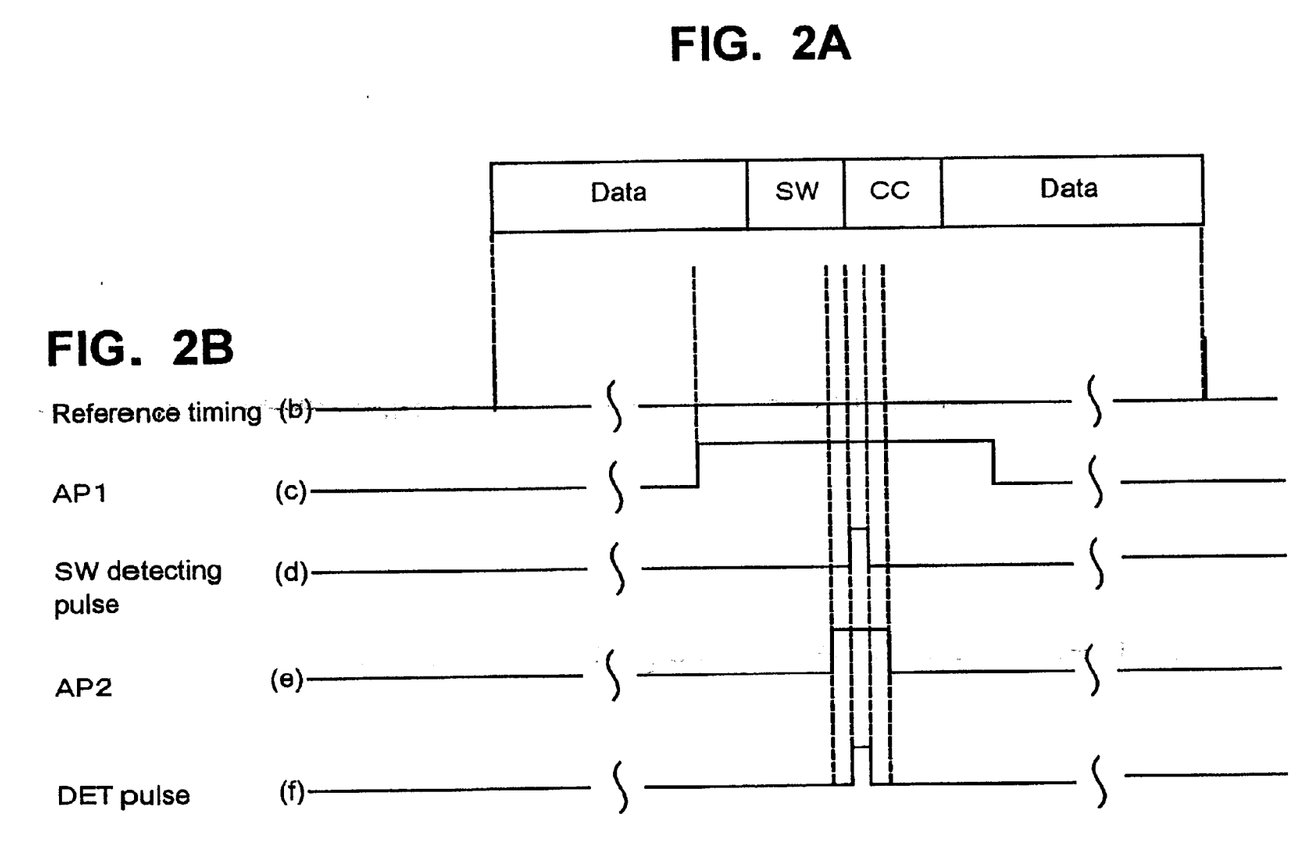
FIG. 2A shows a physical channel format of the digital reception signal.
FIG. 2B shows signals in each section.

In the embodiment, the synchronized word and color code of the digital reception signal (b) will be explained according to FIGS. 2A and 2B. FIG. 2A shows a physical channel format of the digital reception signal (b), and FIG. 2B shows signals in each section.

In FIG. 2A, a format of the digital reception signal (b) for one frame is shown. One frame is formed of 280 bits, of which 20 bits are for the synchronized word SW, and 8 bits are for the color code CC.

Therefore, the detection of the synchronized word SW or color code CC in the synchronized word detector 6 is determined by judging whether the synchronized word SW or color code CC is coincident with each predetermined bit pattern or not. Additionally, the signal format includes data sections, which are respectively in front of the synchronized word SW and behind the color code CC.

In this example, the synchronized word is necessary to establish a timing of receiving signals in the base station, and the color code CC is an interference countermeasure code allocated in each cluster, which is a frequency repeating unit, for distinguishing radio signals transmitted from an interference station. Each eight bits are allocated as a color code CC in a frame of all radio burst signals. 255 of the same patterns except a pattern of "00" are employed for upward and downward channels.

(b) of FIG. 2B is a reference timing of generating the first synchronized word detecting window AP1, i.e., a clock synchronized to a transmission reference timing in the radio base station, and a relationship of phases between the reference timing and the first synchronized word detecting window AP1, shown in (c) of FIG. 2B, is always fixed.

As described above, a position of detecting pulse of the synchronized word SW, shown in (d) of FIG. 2B, is changed in the first synchronized word detecting window AP1, according to the change of phase of the digital reception signal (b).

Returning back to FIG. 1, the synchronized word detector 6 stores the numbers of error bits of the synchronized word SW and color code CC, which are detected in the first synchronized word detecting window AP1 in a synchronizing register 7. The numbers of error bits of the synchronized word and color codes CC stored in the synchronizing register 7 can read out by the CPU 3. Concurrently, phase information of the synchronized word detecting pulse, i.e., position information of the detecting pulse of the synchronized word SW, as shown in (d) of FIG. 2B, is stored in the synchronizing register 7, so as to be read out by the CPU 3.

Additionally, the synchronizing register 7 includes a writing register, not shown in the diagram, which writes a signal for resetting the second synchronized word detecting window generator 8. The second synchronized word detecting window generator 8 generates a second synchronized word detecting window AP2 corresponding to (e) of FIG. 1 and (e) of FIG. 2B, of which width is narrower than that of the first synchronized word detecting window AP1, around the first synchronized word detecting pulse corresponding to (d) of FIG. 1 and (d) of FIG. 2B, detected in the synchronized word detector 6.

Once the generation of second synchronized word detecting window AP2 is started, a relationship of phases between the first and second synchronized word detecting windows AP1 and AP2 is not changed, regardless of existence of the first synchronized word detecting pulse (d) from the next frame.

A signal for resetting the second synchronized word detecting window generator 8 is written in the synchronizing register 7. Only when the second synchronized word detecting window generator 8 is reset by the resetting signal, a position of generating the second synchronized word detecting window AP2, of which width is narrower than that of the first synchronized word detecting window AP1, around the next synchronized word detecting pulse (d).

In other words, it is apparent from FIG. 2 that the second synchronized word detecting window AP2 prevents from detecting the synchronized word SW from being mistakenly detected in the first synchronized word detecting window AP1. When the synchronized word SW is detected at first time, the second synchronized word detecting window generator 8 generates the second synchronized word detecting window AP2 around the position of the detected pulse (d) of the synchronized word SW.

After that, the relationship of phases between the first and second synchronized word detecting windows AP1 and AP2 is not changed, until the second synchronized word detecting window generator 8 is reset by the resetting signal.

Additionally, a DET pulse generator 9 outputs a determination (DET) pulse (f), according to an AND condition of the synchronized word detecting pulse (d) and the second synchronized word detecting window AP2 in FIG. 1.

The DET pulse generator 9 generally outputs the DET pulse (f), according to the AND condition of the synchronized word SW detecting pulse (d) and the second synchronized word detecting window AP2. When the synchronized word SW detector 6 can not detect the synchronized word SW, the DET pulse generator 9 generates the DET pulse (f) at a center of the second synchronized word detecting window AP2 and outputs the generated DET pulse.

Although the synchronized word SW detecting pulse (d) is within the first synchronized word detecting window AP1, however, the DET pulse (f) is not output, when the pulse is outside of the width of second synchronized word detecting window AP2.

In FIG. 1, a reception signal processor 200 includes a data extracting section 10, which inputs the digital reception signal (b) transmitted from the demodulator 1, extracts the data according to the DET pulse (f) transmitted from the DET pulse generator 9 and the reference timing transmitted from the timing generator 4, and stores it in a buffer 11.

In the reception signal processor 200, the data stored in the buffer 11 is deinterlieved in a deinterlieving processor 12, based on the digital cellar telephone system standard (RCRSTD-27). The deinterlieving process is that the data of the reception signal, which is written in vertical, is changed back to an original ordered signal by reading the data in horizontal.

Then, a BCH demodulator 13 performs BCH decoding for the data deinterlieved in the deinerleaving processor 12, based on the digital cellar telephone system standard (RCRSTD-27). Additionally, the decoding result is stored in the reception signal-processing register 14.

A CRC arithmetic section 15 performs CRC arithmetic for the data BCH decoded in the BCH demodulator 13, based on the digital cellar telephone system standard (RCRSTD-27), and outputs the result. The BCH demodulator 13 further stores the result in the reception signal-processing register 14, similarly to the case of the BCH demodulator 13.

In FIG. 1, the timing generator 4 generates a reference timing and CLK signals required for processes in the synchronizing section 100 and the reception signal processor 200, and supplies timings (i), which are respectively used to read out data of the registers 2, 7 and 14 to the CPU 3.

The CPU 3 monitors the registers 2, 7 and 14, according to the read out timing (i) transmitted from the timing generator 4. The CPU 3 further reads out the number of bit errors of the synchronized words, which is set in the synchronizing register 7, and the number of bit errors of the color code, and calculates a bit error rate for the number of each optional frames, according to the numbers read out.

Although it will be later described in detail, a memory 16 stores a condition of resetting the second synchronized word detecting window generator 8, in FIG. 1. The CPU 3 judges whether the calculated bit error rate is coincident or not, according to the condition of resetting the second synchronized word detecting window generator 8, which is stored in the memory 16. The result of judgement is written, as resetting data, in a second synchronized word detecting window generator resetting register, not shown in the diagram, of the synchronizing resistor 7.

The above described case where the calculated bit error rate is coincident to the condition of resetting the second synchronized word detecting window generator 8 will be now explained as one embodiment as follows.

As shown in FIG. 1, the CPU 3 reads out the number of errors of the synchronized word SW, which is set in the synchronizing register 7 in each frame, according to the read out timing (i) of the synchronizing register 7 transmitted from the timing generator 4.

Then, the CPU 3 calculates the bit error rate in N frames, according to the number of errors of the synchronized word SW. The CPU 3 controls the AP2 generator resetting register of the synchronizing register 7, not shown in the diagram, to reset the second synchronized word detecting window generator 8 on the condition of resetting the second synchronizing word detecting window generator 8 set in the memory 16 that the bit error rate of synchronizing words is more than X%.

Then, the CPU 3 changes a position of generating the second synchronizing word detecting window AP2, based on a position of synchronized word detecting pulse (d) in the second synchronized word detecting window AP2. Therefore, it becomes possible to prevent from missing protection against the synchronized word detecting pulse (d) by the second synchronized word-detecting window AP2.

Figure 3:
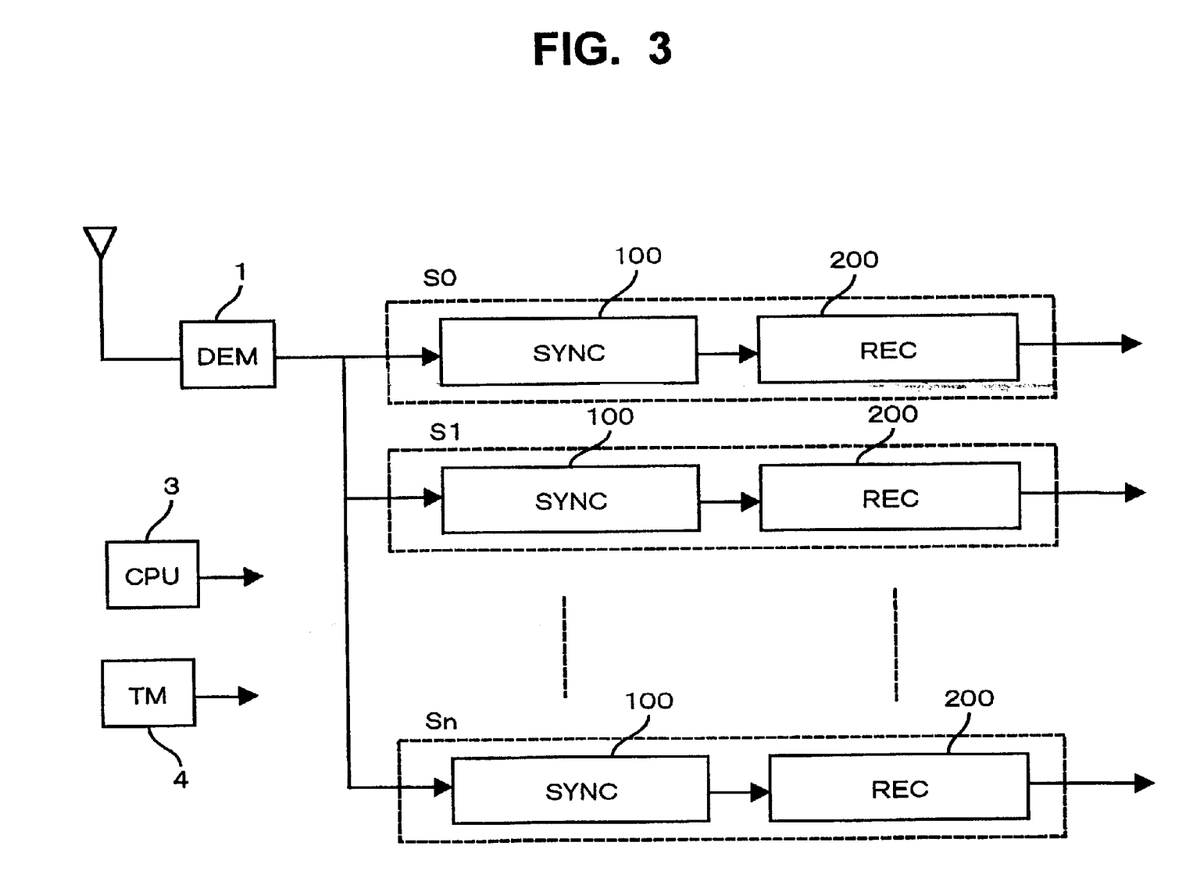
FIG. 3 is a structural diagram of one embodiment of the present invention, in which a received section of the radio base station is illustrated.

An example of calculating the bit error rate of the synchronized words will be now explained as one embodiment. FIG. 3 is a structural block diagram of one embodiment according to the present invention, in which a receiving section of the radio base station is illustrated. In FIG. 3, the same reference numerals and symbols are used to denote and identify corresponding or identical components shown in FIG. 1, and structures of the synchronizing section 100 and the reception signal processor 200 are respectively provided corresponding to plural slots (S0 to Sn) of the reception signal.

In the embodiment of FIG. 3, the CPU 3 monitors the receiving sections for each slot, respectively. Thereby, the second synchronized word detecting window generator 8 can be reset in each slot, according to the condition of resetting the second synchronized word detecting window generator 8 in each slot. The example of calculating the condition of resetting the second synchronized word detecting window generator 8 in this structure will be now described as follows.

Assuming that the number of errors of the synchronized words SW for each optional continuous 6 frames as D1, D2, D3, D4, D5 and D6, the error rate is calculated in each 3 frames. For example, it is possible to calculate a first error rate by using an average value of D1, D2 and D3 and to calculate a next error rate by using an average value of D4, D5 and D6. Alternatively, it is also possible to calculate the first error rate by using an average value of D1, D2 and D3, and to calculate the next error rate by using an average value of D2, D3 and D4.

To be concretely, the number of errors of synchronized word can be expressed by the number of error bits included in the number of bits (20) of the synchronized word SW in one frame (the maximum value is 20). The number of errors of the synchronized words SW in the continuous 6 frames (D1 to D6) are respectively 2, 1, 0, 0, 1, 1, for example.

When calculating the error rate in each three frames, the first error rate is calculated as an average value of D1, D2 and D3 and the next error rate is calculated as an average value of D4, D5 and D6.

Then, these error rates can be expressed as follows:

$$\text{First error rate} = \frac{\text{A number of errors of } SW \text{ in 3 frames } (D1 + D2 + D3)}{\text{Total number of bits of } SW \text{ in 3 frames } (60)} \times 100 \, (\%)$$

$$= \frac{3}{60} \times 100 = 5 \, (\%)$$

$$\text{Next error rate} = \frac{\text{A number of errors of } SW \text{ in 3 frames } (D4 + D5 + D6)}{\text{Total numer of bits of } SW \text{ in 3 frames } (60)} \times 100 \, (\%)$$

$$= \frac{2}{60} \times 100 = 3.3 \, (\%)$$

In the example that the second synchronized word detecting window generator 8 is reset, an error rate of color code CC will be now calculated. As shown in FIG. 1, the CPU 3 reads out the number of errors of the color code of the synchronizing register 7 in each frame, according to the read out timing (i) of the synchronizing register 7 transmitted from the timing generator 4. Then, the CPU 3 calculates the bit error rate in N frames.

The calculated bit error rate is compared with an error rate X% of color code CC, which is a condition of resetting the second synchronized word detecting window generator 8 stored in the memory 16. The second synchronized word detecting window generator 8 is reset through the second synchronized word detecting window generator resetting register of the synchronizing register 7, which is not shown in the diagram, under a reset condition that the calculated bit error rate of color code CC is more than the error rate X% of color code CC.

The position of generating the second synchronized word detecting window AP2 is changed by the reset operation, based on the position of the synchronizing word detecting pulse (d) in the first synchronized word detecting window AP1 at that time. Therefore, it becomes possible to prevent from missing protection against the synchronized word detecting pulse (d) by the second synchronized word-detecting window AP2.

As a third method of resetting the second synchronized word detecting window generator 8, the reset operation can be performed, based on the result of BCH decoding.

As shown in FIG. 1, the CPU 3 reads out the result of BCH decoding stored in the reception signal processing register 14 in each frame, according to the read out timing (i) of the synchronizing register 7 transmitted from the timing generator 4. When the result fulfills the condition of the BCH decoding result for resetting the second synchronized word detecting window generator 8 set in the memory 16, the second synchronized word detecting window generator 8 is reset through the second synchronized word detecting window generator resetting register, not shown in the diagram.

Thereby, the position of generating the second synchronized word detecting window AP2 is changed, based on the position of the synchronized word detecting pulse (d) in the first synchronized word detecting window AP1.

In other words, when the CPU 3 detects that the error continuously occurs more than N times, or detects the error occurs more than N times in the N frames, the CPU 3 controls the second synchronized word window generator resetting register, not shown in the diagram, to reset the second synchronized word detecting window generator 8. Therefore, it becomes possible to prevent from missing protection against the synchronized word detecting pulse (d) by the second synchronized word-detecting window AP2.

As a fourth method of resetting the second synchronized word detecting window generator 8, the reset operation can be performed, based on the result of CRC arithmetic, similarly with the case of using the BCH decoding result.

In other words, the CPU 3 reads out the result of CRC arithmetic of the reception signal processing register 14 in each CRC arithmetic process of each functional channel of the received data, according to the read out timing (i) of the synchronizing register 7 transmitted from the timing generator 4.

When the result of CRC arithmetic fulfills the condition of resetting the second synchronized word detecting window generator 8, which is set in the memory 16, the second synchronized word detecting window generator 8 is reset through the second synchronized word detecting window generator resetting register of the synchronizing register 7.

Thereby, the position of generating the second synchronized word detecting window AP2 is changed, based on the position of the synchronized word detecting pulse (d) in the first synchronized word detecting window AP1 at that time. Therefore, it becomes possible to prevent from missing protection against the synchronized word detecting pulse (d) by the second synchronized word-detecting window AP2.

When the CRC arithmetic result fulfils the condition of resetting the second synchronized word detecting window generator 8, i.e., at the time the CPU 3 detects that the error continuously occurs more than N times in each result of CRC arithmetic or at the time the CPU 3 detects the error occurs more than N times in N frames, for example, the CPU 3 controls the second synchronized word detecting window generator resetting register to reset the second synchronized word detecting window generator 8.

Additionally, it is possible to control the resetting operation, based on a phase of detecting the synchronized words SW, as a fifth method of resetting the second synchronized word detecting window generator 8.

In other words, as shown in FIG. 1, the CPU 3 reads out a phase value of detecting the synchronized word of the synchronizing register 7 in each frame, according to the read out timing (i) of the synchronizing register 7 transmitted from the timing generator 4. Then, the CPU 3 calculates the phase value of detecting the synchronized word in N frames.

The calculated phase value of detecting the synchronized words is compared with a difference X of an average value of phases of detecting the synchronized word, which is the condition of resetting the second synchronized word detecting window generator 8 set in the memory 16. When the calculated phase value of detecting the synchronized word is more than the difference X of the average value of phases of detecting the synchronized words, the condition of resetting the second synchronized word detecting window generator 8 fulfills.

Then, the second synchronized word detecting window generator 8 is reset through the second synchronized word detecting window generator resetting register, not shown in the diagram, of the synchronizing register 7. The position of generating the second synchronized word detecting window AP2 is changed, based on the position of the synchronized word detecting pulse (d) in the first synchronized word detecting window AP1 at that time. Therefore, it becomes possible to prevent from missing protection against the synchronized word detecting pulse (d) by the second synchronized word-detecting window AP2.

Figure 4:
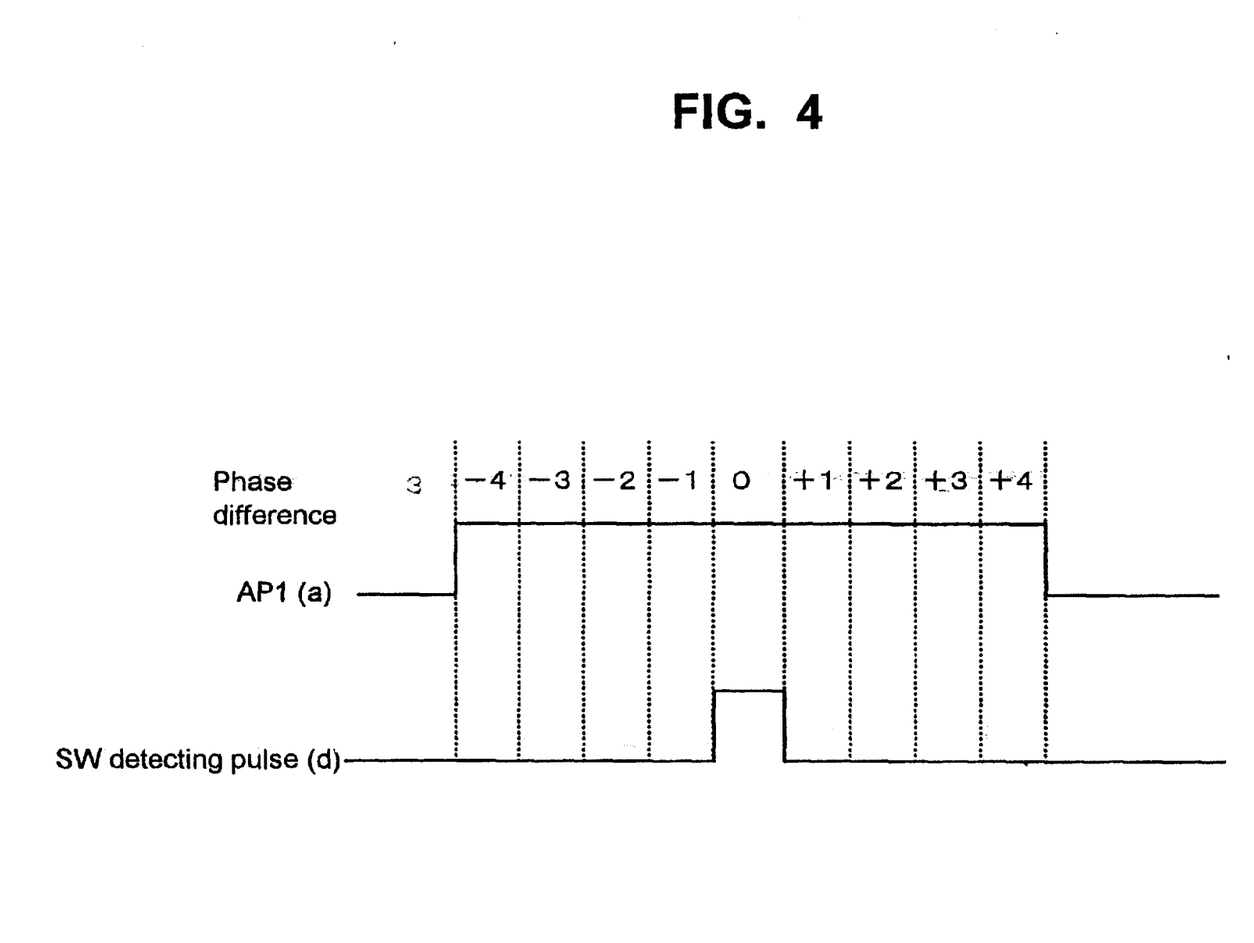
FIG. 4 shows a relationship of phase values for positions of synchronized word SW detecting pulse in the first synchronized word-detecting window AP1.

The fifth method will be further explained according to a detailed example. FIG. 4 shows a relationship of phase values for each position of the detecting pulse (d) of the synchronized word SW in the first synchronized word-detecting window AP1.

The second synchronized word detecting window generator 8 is reset under the resetting condition that the difference of the average of phase values in each five frames is more than "1". As one example, the phase values of the synchronized word detecting pulse in optional 10 frames are shown as follows.

$$
\left.\begin{array}{l}
\left.\begin{array}{l}
\text{The first frame phase}: 0 \\
\text{The second frame phase}: 0 \\
\text{The third frame phase}: -1 \\
\text{The fourth frame phase}: 0 \\
\text{The fifth frame phase}: +1
\end{array}\right\} \text{Average phase } 0.4 \\
\left.\begin{array}{l}
\text{The sixth frame phase}: +1 \\
\text{The seventh frame phase}: +1 \\
\text{The eighth frame phase}: +2 \\
\text{The ninth frame phase}: +2 \\
\text{The tenth frame phase}: +2
\end{array}\right\} \text{Average phase } 1.6
\end{array}\right\} \text{Difference } 1.2
$$

In the above-described example, the average value of the first five frames is 0.4, and the average value of the next five frames is 1.6. Therefore, the difference is 1.2. The result fulfills the condition that the difference is more than "1". Thereby, the second synchronized word detecting window generator 8 is reset.

In here, the average value of phases of the first to the fifth frames and the average value of phases of the sixth to tenth frames can be respectively obtained from the following relational equations:

$$\text{Average value of phases of first to fifth frames} = \frac{\text{Sum of phases for the number of frames for obtaining average value} (\pm \text{ is omitted})}{\text{the number of frames for obtaining average value}}$$
$$= \frac{2}{5} = 0.4$$

$$\text{Average value of phases of sixth to tenth frames} = \frac{\text{Sum of phases for the number of frames for obtaining average value} (\pm \text{ is omitted})}{\text{The number of frames for obtaining average value}}$$
$$= \frac{8}{5} = 1.6$$

A difference between the average value of phases of the first to fifth frames and the average value of phases of the sixth to tenth frames can be expressed as: 0.4–1.6=1.2 (where ± is omitted).

Next, as a sixth embodiment of resetting the second synchronized word detecting window generator 8, the resetting operation can be performed, based on a received state of the reception signal.

In other words, the CPU 3 reads out a reception level of the demodulating register 2 in each frame, according to the read out timing (i) of the synchronizing register 7 transmitted from the timing generator 4, as shown in FIG. 1.

Then, the CPU 3 calculates an average of the read out reception levels in N frames. The reception level X, which is a condition of resetting the second synchronized word detecting window generator 8 stored in the memory 16, is compared with the calculated average reception level.

When the average reception level fulfills a resetting condition that the level is less than a reception level X, the second synchronized word detecting window generator 8 is reset through the second synchronized word detecting window generator resetting register, not shown in the diagram, of the synchronizing register 7. Thereby, the position of generating the second synchronized word detecting window AP2 can be changed, based on the position of the synchronized word detecting pulse (d) in the first synchronized word detecting window AP1 at that time. Therefore, it becomes possible to prevent from missing protection against the synchronized word detecting pulse (d) by the second synchronized word-detecting window AP2.

As the embodiments according to the present invention are explained in accompanying to the attached drawings, it becomes possible to maintain establishing a synchronization, regardless of the state, even when phases of signals received in a radio base station are widely changed. Thereby, the present invention can improve performance of receiving signals in a radio base station.

The invention may be embodied in other specific forms without departing from the sprit or essential characteristics thereof. The present embodiment is therefore to be considered in all aspects as illustrative and not restrictive, the scope of the invention being indicated by the appended claims rather than by the foregoing description and all changes which come within the meaning and range of equivalency of the claims are therefore intended to be embraced therein.

What is claimed is:

1. A synchronization protecting and setting system for signals received in a radio base station comprising:
    a first means for generating a first detecting window, which covers a position of a predetermined pattern provided in a reception signal received at the radio base station;
    a second means for generating a second detecting window, which covers the position of the predetermined pattern within the first detecting window;
    a means for detecting the predetermined pattern in the first or second detecting window; and
    a control means for resetting the position of the second detecting window relative to the first window under a predetermined condition,
    wherein synchronization is detected by checking coincidence of the reception signal with the predetermined pattern in the first detecting window at a first frame and the detecting means detects synchronization in the set second detecting window at a subsequent frame.

2. The system according to claim 1,
    wherein the predetermined pattern is fanned of plural bits, and the control means resets the position of the second detecting window, when a bit error rate of the predetermined pattern is more than a predetermined value, as the predetermined condition.

3. The system according to claim 1,
wherein the reception signal further includes a color code formed of plural bits, and the control means resets the position of the second detecting window, when a bit error rate of the color code is more than a predetermined value, as the predetermined condition.

4. The system according to claim 1,
wherein the control means resets the position of the second detecting window, when an average amount of phase difference in the number of frames of the signals received in the radio base station is more than a predetermined value, as the predetermined condition.

5. The system according to claim 1,
wherein the control means resets the position of the second detecting window, when the result of BCH decoding for signals received in the radio base station is mistaken, as the predetermined condition.

6. The system according to claim 1,
wherein the control means resets the position of the second detecting window, when the result of CRC arithmetic for signals received in the radio base station is mistaken, as the predetermined condition.

7. The system according to claim 1,
wherein the control means resets the position of the second detecting window, when a level of the signal received in the radio base station is less than a predetermined value, as the predetermined condition.

8. A synchronization protecting and setting method for signals received in a radio base station comprising the steps of:
generating a first detecting window, which covers a position of a predetermined pattern provided in a reception signal received at the radio base station;
generating a second detecting window, which covers the position of the predetermined pattern within the first detecting window;
detecting the predetermined pattern in the first or second detecting window; and
resetting the position of the second detecting window as related to the first detecting window under a predetermined condition,
wherein synchronization is detected by checking coincidence of the reception signal with the predetermined pattern in the first detecting window at a first frame, the detecting means detects synchronization in the set second detecting window at a subsequent frame.

9. A synchronization apparatus provided in a radio base station comprising:
a first window generator for generating a first synchronized word detecting window, which covers a position of a synchronized word provided in a reception signal received at the radio base station;
a synchronized word detector for detecting a synchronized word present in a received signal within the first synchronized word detecting window and outputting a synchronized word detecting pulse;
a second window generator for generating a second synchronized word detecting window, which covers the position of the synchronized word detected by the synchronized word detector as is within the same time period as the first synchronized word detecting window;
a pulse generator for outputting a detecting pulse according to an AND condition of the synchronized word detecting pulse and the second synchronized word detecting window; and
a register for resetting the position of the second synchronized word detecting window as related to the first synchronized word detecting window under a predetermined condition.

10. A synchronization protecting and setting method for received signals, comprising the steps of:
detecting synchronization by checking coincidence of a reception signal with a predetermined pattern in a first detecting window at a frame a first;
setting a position of a second detecting window, based on the detection result in the first detecting window, the second detecting window being narrower than the first detecting window; and
detecting the synchronization in the set second detecting window at a subsequent frame, and
changing said setting position of the second detecting window based on a receiving condition.

* * * * *